Feb. 20, 1968  P. W. ALLEN  3,370,149
PLATEN CONTROL MECHANISM FOR WELDING MACHINES
Filed March 15, 1965  2 Sheets-Sheet 1

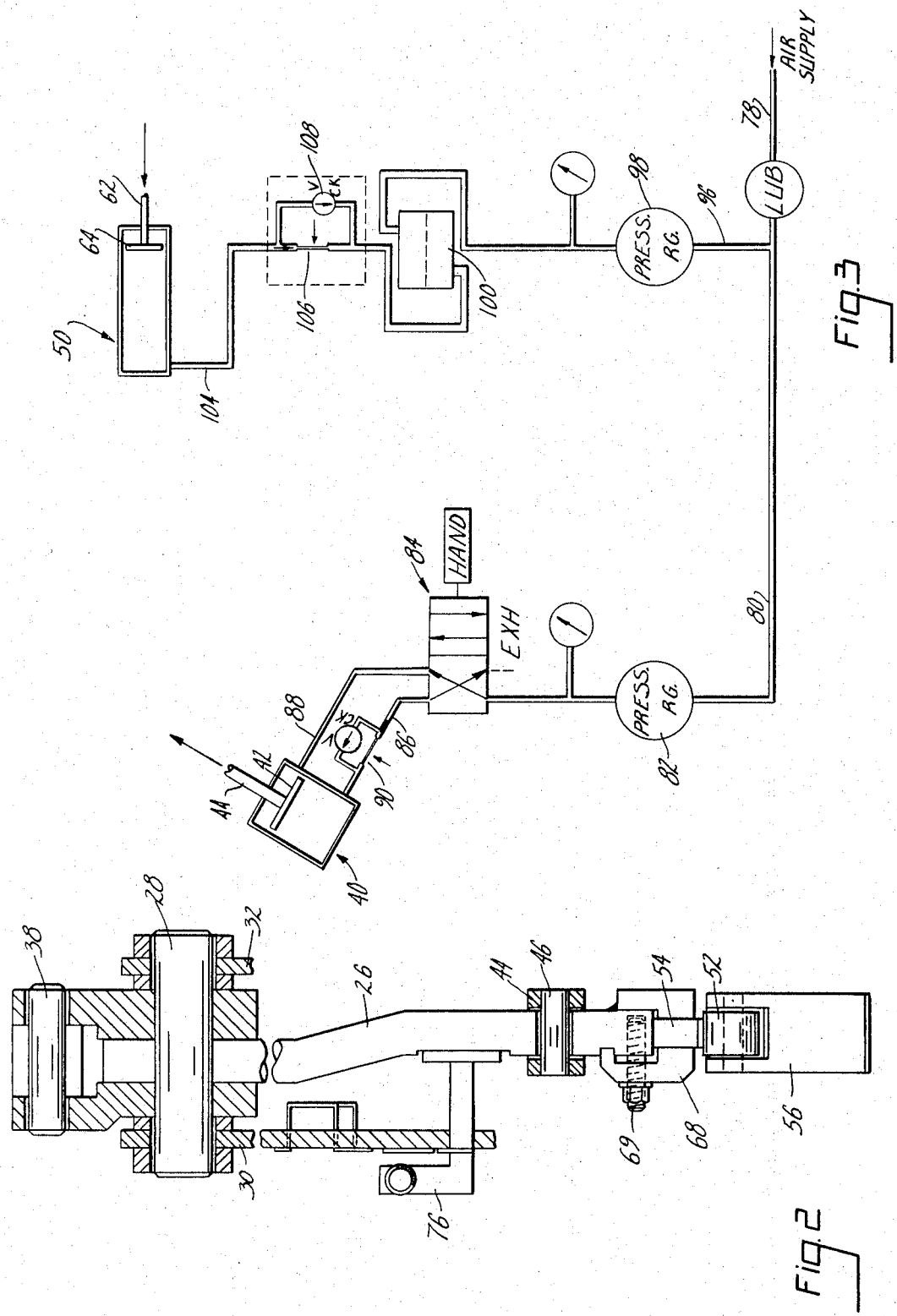

United States Patent Office 3,370,149
Patented Feb. 20, 1968

3,370,149
PLATEN CONTROL MECHANISM FOR
WELDING MACHINES
Peter W. Allen, Wakefield, Mass., assignor to Thomson
Electric Welder Company, Inc., Lynn, Mass., a corporation of Massachusetts
Filed Mar. 15, 1965, Ser. No. 439,784
3 Claims. (Cl. 219—97)

The present invention relates to welding and especially to a new and improved mechanism for controlling the relative movement of the platens of a flash-butt-welding machine.

The invention is intended as an improvement upon a flash-butt-welding machine of the general type in which the advance of the movable platen is effected by a fluid motor through connections having a snubbing action to effect an initial flash off movement at a varying rate determined by the operation of said snubbing connections, followed by a final movement to the upset position at a pressure determined by the operation of said fluid motor.

It is a principal object of the invention to provide an improved platen control mechanism having a main fluid motor for shifting the movable platen to the upset position, and a fluid operated snubbing device which acts through a cam and follower connection to produce the desired retarded flash off, and thereafter an unchecked power upset movement of the movable platen.

With the above and other objects in view as may hereinafter appear, the several features of the invention will be readily appreciated by one skiled in the art from the following description taken in connection with the accompanying drawings in which:

FIG. 2 is a somewhat fragmentary detail view looking from the right of FIG. 1 illustrating particularly the vertically disposed platen operating lever and certain associated parts; and FIG. 3 is a diagram of the fluid pressure and electrical operating connections for the machine.

Figure 1:
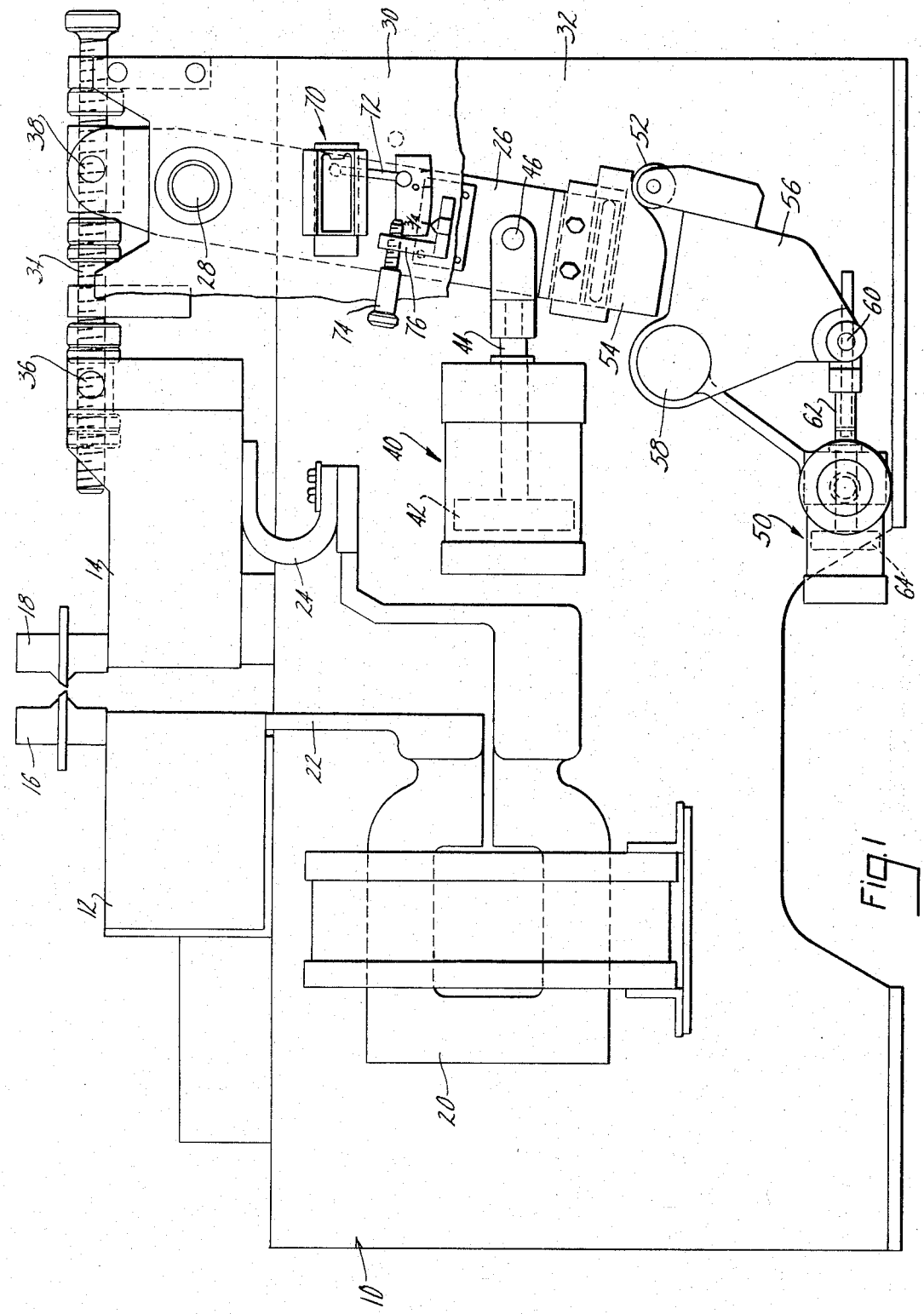
FIG. 1 is a somewhat fragmentary view partly in section of a flash-butt-welding machine embodying in a preferred form the several features of the invention.

Referring to the drawings, the machine comprises a frame, generally indicated at 10, on which are supported a fixed platen 12 and a movable platen 14 having mounted thereon work clamps 16, 18 which are electrically connected to the opposite sides of the low voltage winding of a transformer 20 by two conductors 22, 24.

The platen control mechanism of the illustrated machine by means of which the movable platen 14 is advanced at a relatively slow rate while a heavy welding arc is set up between the approaching parts to be welded and is thereafter brought abruptly forward for butting the parts firmly together as the current is shut off comprises upright lever 26 supported to turn about a transverse pivot shaft 28 supported adjacent each end on respective front and rear frame plates 30 and 32. The platen 14 is connected to move with the lever 26 by means of an adjustable link 34 connected at one end by a pivot pin 36 with the platen 14 and at its other end by means of a cross pin 38 with the bifurcated upper end of the lever 26. The platen 14 and the operating connections therefor including the vertically disposed actuating lever 26 are moved from the fully retracted position shown in FIG. 1 to effect the flash off and finally to a fully advanced butt-engaging upset position by means of a fluid actuated cylinder 40 and piston 42 connected by a link 44 with a lower portion of the upstanding platen actuating lever 26, the link 44 being bifurcated at its outer end to receive a pivot pin 46 which extends transversely through an aperture in the lever 26. The fluid pressure applied to the left hand end of the pressure cylinder 40 is controlled to determine the collision pressure applied at the upset as the platen 14 reaches the limit of its advance against the fixed platen 12.

The rate at which the platens are moved toward one another during the flash off portion of the operation is critical. In previous machines the platens have been moved relatively toward one another at an accelerating rate established by the resistance of a hydraulic snubbing device having a constant rate of let off, and an interposed toggle connection, which, as the toggle is straightened, permits the rate of advance of the platen to be rapidly increased.

In the illustrated construction the advance of the movable platen 14 is controlled during the flash off portion of the operation by means of a hydraulic snubbing cylinder 50 which causes a cam follower 52 to be held against, and to resist movement of, a cammed element 54 secured to the lower free end of the platen actuating lever 26. The follower 52 is mounted on one arm of a bell crank follower lever 56 supported to turn on a pivot pin 58 mounted on the frame 10. A downwardly extending portion of the bell crank lever 56 is pivotally connected by a pin 60 with the outer end of a piston rod 62 and piston 64 forming elements of the snubbing cylinder 50.

In the operation of the platen control mechanism above described, movement of the lower end of the actuating lever 26 to the right under the influence of the main pressure cylinder 40 causes the cam 54 to engage and move the follower 52 in a generally downward direction about the pivot 58 against the action of the snubbing cylinder 50, which permits the follower 52 thus to move downwardly at a substantially constant rate. The rate of the swinging movement of the actuating lever 26, and the corresponding rate of advance of the platen 14 are thus determined by the contour of the cam 54. From an inspection of FIG. 1 it will be evident that the rate of advance of the actuating lever 26 is permitted to increase as the follower 52 approaches the lower flat portion of the cam. Finally, when the follower 52 reaches the flat portion of the cam the resistance supplied by the snubbing cylinder 50 becomes wholly ineffective so that the actuating lever 26 and platen 14 are permitted to advance unimpeded under the full pressure of the main cylinder 40 to the upset collision position.

In the illustrated form of the device the cam 54 is contoured to provide exactly the same speed curve as that provided by the hydraulic snubbing cylinder controlled toggle mechanism of the prior art. It will be appreciated, however, that the present arrangement is capable of far more extended use than the hydraulically snubbed toggle let-off devices of the prior art in that the speed curve employed is readily modified by a change of cam contour for the welding of different materials. To facilitate such adjustment the cam 54 is removably secured by a clamping plate 68 and clamping bolts 69 into a holder formed by a finished bottom edge of the actuating lever 26 and a downwardly extending rear extension of the lever 26.

The current is turned on at the beginning of the welding operation by means of a switch, not shown, and is then turned off as the platen 14 moves to the upset position, by means of a switch generally designated at 70 on the machine having a downwardly extending switch arm 72 adapted to be engaged by an adjustable actuating screw 74 threaded through a bracket 76 secured to the actuating lever 26. Since the electrical connections above referred to are well known in the art and form specifically no part of the invention no further description thereof is believed necessary.

The operating controls for the main air operated pressure cylinder 40 and the hydraulic snubbing system 50, as shown in the diagrammatic FIG. 3, comprises an air supply line 78 from a source, not shown, a branch line 80 through which air is supplied to a pressure regulator 82 and to a manually operated reversing valve 84 having pipe connections 86 and 88 to opposite ends of the main pressure cylinder 40. The pipe line 86, through which air pressure is exhausted from the trailing end of the pressure cylinder 40 during the advancing movement of the piston 42 and movable platen 14 driven thereby, has formed therein a throttle valve generally designated at 90 for controlling the rate of retraction of the movable platen 14 under the influence of the main pressure cylinder 40. A check valve 92 connected to the upstream and downstream sides of the throttle valve 90 provides for a maximum flow of air through the pipe line 88 in the reverse direction into the leading end of the pressure cylinder 40 to effect a rapid advance of the piston 42 and movable platen 14 during the upset portion of the cycle when the snubbing cylinder is no longer effective.

The second branch line 96 from the air supply line 78 feeds air to a pressure regulator 98, and thence to an accumulator or air-oil tank 100 diagrammatically shown, air being admitted to the upper end of accumulator 100, while oil or hydraulic fluid is admitted to the lower end thereof. The snubbing cylinder 50 is connected with the accumulator 100 by means of pipe line 104 having formed therein a throttle valve 106 and a bypass connection including a check valve 108. The forced movement of the snubbing cylinder piston 64 as the cam follower 52 moves downwardly causes oil to be forced through the restriction provided by throttle valve 106 to the accumulator 100, thus providing the desired snubbing action to resist downward movement of the follower 52 as shown in FIG. 1. The piston 64 and follower 52 are subsequently returned quickly to their initial stopping position in the reverse direction under the influence of the air pressure supplied to the accumulator 100 as oil from the accumulator 100 passes freely through the bypass valve 108 to the snubbing cylinder 50.

The invention having been described what is claimed is:

1. Platen control mechanism for a flash-butt-welding machine having a relatively fixed platen, and a platen supported for flash and continuing upset movement between retracted and upset positions adjacent said relatively fixed platen, which comprises a fluid motor, and means connecting said motor to the movable platen to shift said movable platen between said retracted and upset positions, a cam in said connecting means supported for movement therewith along a predetermined path, a cam follower movable against said cam along a path transverse to the path of said cam, and a fluid pressure operated snubbing device connected with said cam follower providing a controlled resistance to the movement of said follower by said cam, thereby to control the rate of advance of said movable platen in said flash and continuing upset movements, said cam being contoured to vary the effective resistance to the movement of said cam along its path to produce a regulated flash followed by a free upset movement of said movable platen under the influence of said fluid motor.

2. Platen control mechanism for a flash-butt-welding machine having a relatively fixed platen, and a movable platen movable between retracted and upset positions adjacent said relatively fixed platen, a control mechanism for effecting flash and continuing upset movement of said movable platen against said stationary platen, which comprises a lever rotatable about a fixed pivot and connected to move said movable platen between a fully retracted position and the upset position, a fluid cylinder connected with said lever adapted for moving said lever and platen between retracted and upset positions, means for applying fluid under pressure to said cylinder, and a device for controlling the rate of advance of said lever and platen actuated thereby comprising a cam and follower connection between said lever and said movable snubbing element including a cam on said lever supported for movement therewith in a predetermined path, a follower movable against said cam along a path transverse to the path of said cam, and a snubbing fluid pressure cylinder connected with said cam follower, said cam being contoured to produce a controlled effective resistance of said follower to the movement of said cam along its path, thereby to effect a regulated flash followed by a free upset movement of said movable platen under the influence of said fluid motor.

3. Platen control mechanism for a flash-butt-welding machine according to claim 2 in which a holder is mounted on said lever for removably supporting said cam.

References Cited

UNITED STATES PATENTS 2,492,200   12/1949   H. W. Stieglitz         219—97
2,647,980    8/1953   C. D. Moore           219—97

RICHARD M. WOOD, *Primary Examiner.*

C. CHADD, *Assistant Examiner.*